(No Model.)

J. L. BUCKNAM.
HOOK.

No. 457,524. Patented Aug. 11, 1891.

WITNESSES:

INVENTOR:
James L. Bucknam,
PER
ATTYs.

UNITED STATES PATENT OFFICE.

JAMES LEANDER BUCKNAM, OF COLUMBIA FALLS, MAINE.

HOOK.

SPECIFICATION forming part of Letters Patent No. 457,524, dated August 11, 1891.

Application filed December 1, 1890. Serial No. 373,127. (No model.)

*To all whom it may concern:*

Be it known that I, JAMES LEANDER BUCKNAM, of Columbia Falls, in the county of Washington, State of Maine, have invented certain new and useful Improvements in Draft-Hooks, of which the following is a description sufficiently full, clear, and exact to enable any person skilled in the art or science to which said invention appertains to make and use the same, reference being had to the accompanying drawings, forming part of this specification, in which—

Figure 1:
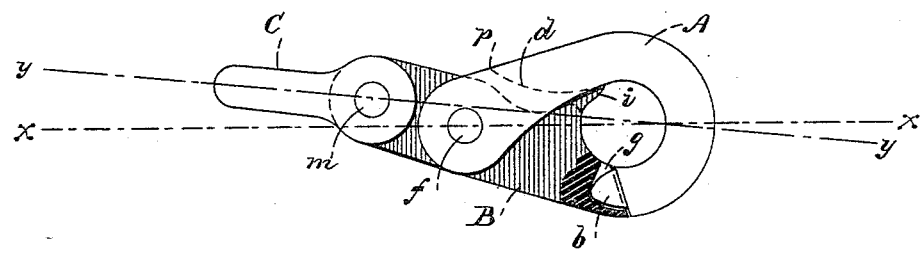
Figure 2:
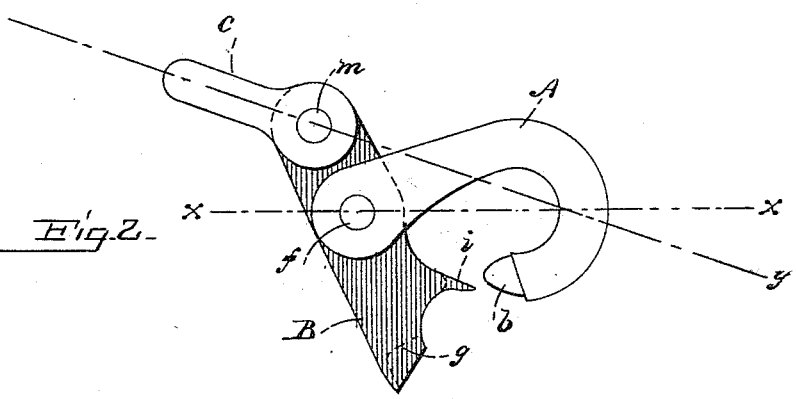

Figure 1 is a side elevation of my improved draft-hook represented as closed; Fig. 2, a like view showing the hook open, and Fig. 3 a side elevation showing a modification. Fig. 4 is a plan view of my improved draft-hook.

Like letters of reference indicate corresponding parts in the different figures of the drawings.

My invention relates especially to self-locking draft-hooks designed particularly for use on vessels; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body of the hook, the toe or point of which is reduced, forming a half-oval projection $b$. Said hook is slotted longitudinally at the eye, as shown by dotted lines $d$ in Fig. 1, to receive the "clog" or latch B, which is secured therein by a pivot $f$. The inner end of the clog is socketed near its outer edge at $g$ to receive the point $b$ of the hook, the inner edge of said clog being provided with a teat or projection $i$, which engages the body A at the inner edge of the clog-slot $d$ when the hook is locked. To the outer end of the clog a link or eye C is pivoted at $m$, and is adapted to receive a draft rope or chain.

In Figs. 1 and 2 the dotted lines $x\ x$ represent the line of resistance and the dotted lines $y\ y$ the line of draft. The clog is so formed that the line of draft is always eccentric or at an angle to the line of resistance. When the hook is opened, as in Fig. 2, to receive a sheave-eye and power is applied to the draft-eye C, pivoted to the outer end of the clog, as described, the inner end of said clog is thrown up into engagement with the point $b$ of the hook, as shown in Fig. 1, securely locking said hook. It will be seen that the greater the draft strain on the clog the more firmly it is forced against said hook, the line of said strain being at an angle to the line of resistance, as specified. The clog being provided with the projection $i$, its peculiar formation serves to prevent the hook from unshipping when the draft strain is released and the hook thrown open, as in Fig. 2, an edge of the clog in this case meeting an inner edge $p$ of the clog-slot and preventing said clog from being thrown outward too far.

Figure 3:
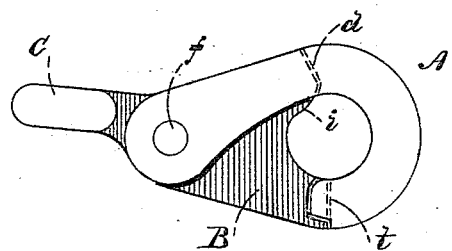
Figure 4:

In the form shown in Fig. 3 the draft-eye C is formed integral with the clog, the operation of the parts, however, being practically the same. The point of the hook-body A is in this form slotted, as shown by dotted lines $t$, to receive the rabbeted end of the clog.

My improved hook is especially designed for use on vessels and other positions where a moused or sister hook is now employed.

Having thus explained my invention, what I claim is—

A snap-hook consisting of a hook A, slotted at its inner end and provided at its outer end with a pin, and a latch or clog B, pivoted to the inner end of said hook, said latch being provided at its outer end with an eye and at its inner end with a socket $g$, adapted to receive the pin $b$, and with a tongue $i$, adapted to engage the inner face of said hook.

JAMES LEANDER BUCKNAM.

Witnesses:
CHAS. A. COFFIN,
E. V. COFFIN.